United States Patent
Pompe (10) Patent No.: US 11,947,036 B2
(45) Date of Patent: Apr. 2, 2024

(54) LASER SCANNER WITH TARGET DETECTION

(71) Applicant: FARO Technologies, Inc., Lake Mary, FL (US)

(72) Inventor: Daniel Pompe, Stuttgart (DE)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

(21) Appl. No.: 18/153,071

(22) Filed: Jan. 11, 2023

(65) Prior Publication Data

US 2023/0168345 A1    Jun. 1, 2023

Related U.S. Application Data (63) Continuation of application No. 16/872,446, filed on May 12, 2020, now Pat. No. 11,686,816.

(60) Provisional application No. 62/847,553, filed on May 14, 2019.

(51) Int. Cl.
*G01S 7/48* (2006.01)
*G01S 7/481* (2006.01)
*G01S 17/42* (2006.01)

(52) U.S. Cl.
CPC .......... *G01S 7/4802* (2013.01); *G01S 7/4817* (2013.01); *G01S 17/42* (2013.01)

(58) Field of Classification Search
CPC .... G01S 7/4802; G01S 7/4813; G01S 7/4817; G01S 17/42; G01S 17/89; G01C 11/025
USPC .......................................................... 702/155
See application file for complete search history.

(56) References Cited

U.S. PATENT DOCUMENTS

| | | | |
|---|---|---|---|
| 6,804,380 B1 | 10/2004 | Ioannou et al. | |
| 8,705,012 B2 | 4/2014 | Greiner et al. | |
| 10,782,118 B2* | 9/2020 | Hillebrand | G01S 17/08 |
| 2015/0109419 A1 | 4/2015 | Vollrath et al. | |
| 2018/0024245 A1 | 1/2018 | Reed, Jr. | |
| 2018/0224270 A1 | 8/2018 | Wolke | |
| 2020/0363505 A1 | 11/2020 | Pompe | |

OTHER PUBLICATIONS

U.S. Appl. No. 16/872,446, filed May 12, 2020, 2020/0363505, Allowed.

(Continued)

*Primary Examiner* — John H Le
(74) *Attorney, Agent, or Firm* — McCarter & English, LLP; Dave S. Christensen (57) ABSTRACT

A scanner that can detect types of targets in a scan are includes a processor, housing and a 3D scanner disposed within the housing The processor is configured to identify locations of one more checkerboard targets disposed in the scan area by: identifying transition locations where adjacent segments on a single scan line transition from a first color to a second color; recording locations of the transition locations as first to second color transition locations; identifying and recording transition locations where adjacent segments on a single scan line transition from the second color to the first color as second to first color transition locations; forming a transition line through adjacent first to second color transition locations and adjacent second to first color transition locations; and identifying a location of a checkerboard target based on the transition line.

17 Claims, 8 Drawing Sheets

(56) References Cited

OTHER PUBLICATIONS

FARO® Laser Scanner Focus 3D, Feb. 2013, 198 pages.
European Search Report for Application No. 20173981.0-1206, dated Aug. 24, 2020, 7 pages.

* cited by examiner

LASER SCANNER WITH TARGET DETECTION

CROSS REFERENCE TO RELATED APPLICATIONS

This application is a continuation of U.S. Non-Provisional application Ser. No. 16/872,446, filed May 12, 2020, which claims the benefit of U.S. Provisional Application Ser. No. 62/847,553, filed May 14, 2019, the entire disclosure of which is incorporated herein by reference.

BACKGROUND

The subject matter disclosed herein relates to use of a three-dimensional (3D) laser scanner coordinate measurement device and, in particular, a 3D laser scanner coordinate measurement device that can detect or otherwise identify targets in a scanning volume.

In general, phase shift 3D laser scanners steer a beam of light to a non-cooperative target such as a diffusely scattering surface of an object. A distance meter in the scanner measures a distance to the object by measuring phase shifts in light reflected back to the scanner from the object, and angular encoders measure the angles of rotation of two axles in the device. The measured distance and two angles enable a processor in the device to determine the 3D coordinates of the target.

Laser scanners are typically used for scanning closed or open spaces such as interior areas of buildings, industrial installations and tunnels. They may be used, for example, in industrial applications and accident reconstruction applications. Such scanners optically scan and measure objects in a volume around the scanner through the acquisition of data points representing object surfaces within the volume. The volume is referred to as a scan volume herein. The raw scan data is collected, stored and sent to a processor or processors to generate a 3D image representing the scanned volume or object.

Generating an image requires at least three values for each data point. These three values may include the distance and two angles, or may be transformed values, such as the x, y, z coordinates. At each point the reflectively of the captured surface can also be determined by measuring the intensity of the reflected light. In this manner a grey scale value can be assigned to each point.

Most scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Accordingly, while existing 3D scanners are suitable for their intended purposes, what is needed is a 3D scanner having certain features of embodiments of the present invention as will be further described below.

BRIEF DESCRIPTION

According to one embodiment, a three-dimensional (3D) measuring device that detects sphere targets is provided. The 3D measuring device of this embodiment includes a processor system including a processor, a housing and a 3D scanner disposed within the housing and operably coupled to the processor system. The 3D scanner has a light source, a beam steering unit, a first angle measuring device, a second angle measuring device, and a light receiver. The beam steering unit cooperates with the light source and light receiver to define a scan area. The light source and the light receiver are configured to cooperate with the processor system to determine locations a plurality of points in the scan area. In this embodiment, the processor is configured to: identify potential sphere center points in the scan area by processing points identified in a single scan line; record locations of potential sphere center points; and compare some or all of the recorded locations to one another to select a sphere center point.

In any prior 3D measuring device that detects sphere targets, the processor can be configured to identify potential sphere center points by defining a moving window that moves along a scan line and, for each point in a middle of the moving window, determining if the point is sphere center point.

In any prior 3D measuring device that detects sphere targets, the processor can be configured to determine that a particular point in the middle of the moving window is a sphere center point by determining if the particular point is on a line between an origin where the 3D measurement device is located and a potential sphere center point.

In any prior 3D measuring device that detects sphere targets, the moving window can include 2n+1 points where n is the number points that can be detected on a scan line within a distance defined by a radius (r) of a sphere to be detected.

In any prior 3D measuring device that detects sphere targets, the processor can be configured to record an error function value for each potential sphere center point.

In any prior 3D measuring device that detects sphere targets, the error function can be defined by:

$$f(ps) = \sum_{i=k}^{l} \left(r - \sqrt{(x_i - x_s)^2 + (y_i - y_s)^2 + (z_i - z_s)^2}\right)^2$$

where $x_i$, $y_i$ and $z_i$ are coordinates of a current point and $x_s$, $y_x$ and $z_s$ are coordinates of the potential sphere center point (ps).

In any prior 3D measuring device that detects sphere targets, the device can further include a display device.

In any prior 3D measuring device that detects sphere targets, the processor can be configured to indicate if some or all of a detected number of sphere targets matches a number of sphere targets in the scan area.

In any prior 3D measuring device that detects sphere targets, the processor can be configured to display an image of the scan indicating locations of detected sphere targets.

Also disclosed is a method of scanning a scan area with a three-dimensional (3D) measuring device. The method includes: rotating the 3D scanner about a first axis, the 3D scanner having a light source, a light receiver and a photogrammetry camera; emitting a plurality of light beams from the light source and receiving with the light receiver a plurality of reflected light beams from an object surface within the scan area; determining, with a processor system, 3D coordinates of a first collection of points on the object surface within a scan area based at least in part on the plurality of light beams and the plurality of reflected light beams; identify potential sphere center points in the scan area by processing points identified in a single scan line; recording locations of potential sphere center points; and comparing some or all of the recorded locations to one another to select a sphere center point.

According to any prior method, potential sphere center points can be identified by defining a moving window that moves along a scan line and, for each point in a middle of the moving window, determining if the point is sphere center point.

According to any prior method, a particular point in the middle of the moving window can be a sphere center point if the particular point is on a line between an origin where the 3D measurement device is located and a potential sphere center point.

According to any prior method, the moving window includes 2n+1 points where n is the number points that can be detected on a scan line within a distance defined by a radius (r) of a sphere to be detected.

According to any prior method, recording a location includes recording an error function value for each potential sphere center point.

According to any prior method, the error function is defined by $$f(ps) = \sum_{i=k}^{l} \left(r - \sqrt{(x_i - x_s)^2 + (y_i - y_s)^2 + (z_i - z_s)^2}\right)^2$$

where $x_i$, $y_i$ and $z_i$ are coordinates of a current point and $x_s$, $y_x$ and $z_s$ are coordinates of the potential sphere center point (ps).

According to any prior method, the method can further include indicating on a display device if some or all of a detected number sphere targets matches a number of sphere targets in the scan area.

According to any prior method, the method can further include displaying an image of the scan on a displaying device indicating location of detected sphere targets.

In another embodiment, a three-dimensional (3D) measuring device that locates checkboard targets is disclosed. The device includes a processor system including a processor, a housing, a 3D scanner disposed within the housing and operably coupled to the processor system, the 3D scanner having a light source, a beam steering unit, a first angle measuring device, a second angle measuring device, and a light receiver, the beam steering unit cooperating with the light source and light receiver to define a scan area, the light source and the light receiver configured to cooperate with the processor system to determine locations a plurality of points in the scan area. The processor is configured to identify locations of one more checkerboard targets disposed in the scan area by: identifying transition locations where adjacent segments on a single scan line transition from a first color to a second color; recording locations of the transition locations as first to second color transition locations; identifying and recording transition locations where adjacent segments on a single scan line transition from the second color to the first color as second to first color transition locations; forming a transition line through adjacent first to second color transition locations and adjacent second to first color transition locations; and identifying a location of a checkerboard target based on the transition line.

In any prior 3D measuring device that locates checkboard targets, the processor can be configured to form segments by determining that adjacent points on a scan line have a same color and are at about a same distance from the 3D scanner.

In any prior 3D measuring device that locates checkboard targets, the processor can be configured to determine that a particular point is a transition location by determining if the particular point is at or near an end of segments on a single scan line.

In any prior 3D measuring device that locates checkboard targets, the checkerboard target can include a plurality of white and black sections, each having a section length $l_s$ and each segment has a segment length that is at least 10% of the section length $l_s$.

In any prior 3D measuring device that locates checkboard targets, the checkerboard target can include a plurality of white and black sections, each having a section length $l_s$, and each segment has a segment length that is less than the section length $l_s$.

In any prior 3D measuring device that locates checkboard targets, the transition line can have a length that is the same or shorter than a length of the checkboard target.

In any prior 3D measuring device that locates checkboard targets, the device can include a display device.

In any prior 3D measuring device that locates checkboard targets, the processor can be configured to indicate if some or all of a detected number checkerboard targets matches a number of checkerboard targets in the scan area.

In any prior 3D measuring device that locates checkboard targets, the processor can be configured to display an image of the scan indicating locations of detected checkerboard targets.

Also disclosed is a method of scanning a scan area with a three-dimensional (3D) measuring device that can locate checkboard targets, comprising: rotating the 3D scanner about a first axis, the 3D scanner having a light source, a light receiver and a photogrammetry camera; emitting a plurality of light beams from the light source and receiving with the light receiver a plurality of reflected light beams from an object surface within the scan area; determining, with a processor system, 3D coordinates of a first collection of points on the object surface within a scan area based at least in part on the plurality of light beams and the plurality of reflected light beams; identifying transition locations where adjacent segments on a single scan line transition from a first color to a second color; recording locations of the transition locations as first to second color transition locations; identifying and recording transition locations where adjacent segments on a single scan line transition from the second color to the first color as second to first color transition locations; forming a transition line through adjacent first to second color transition locations and adjacent second to first color transition locations; and identifying a location of a checkerboard target based on the transition line.

In any prior method of scanning a scan area with a 3D measuring device that can locate checkboard targets, the method can further include forming segments by determining that adjacent points on a scan line have a same color and are at about a same distance from the 3D scanner.

In any prior method of scanning a scan area with a 3D measuring device that can locate checkboard targets, a particular point can be a transition location if the particular point is at or near an end of a segment on a single scan line.

In any prior method of scanning a scan area with a 3D measuring device that can locate checkboard targets, the checkerboard target can include a plurality of white and black sections, each having a section length $l_s$, and each segment has a segment length that is at least 10% of the section length $l_s$.

In any prior method of scanning a scan area with a 3D measuring device that can locate checkboard targets, the checkerboard target can include a plurality of white and black sections, each having a section length $l_s$, and each segment has a segment length that is less than the section length $L_s$.

In any prior method of scanning a scan area with 3D measuring device that can locate checkboard targets, the transition line can have a length that is the same or shorter than a length of the checkboard target.

In any prior method of scanning a scan area with a 3D measuring device that can locate checkboard targets, the method can also include indicating if some or all of a detected number checkerboard targets matches a number of checkerboard targets in the scan area.

In any prior method of scanning a scan area with a 3D measuring device that can locate checkboard targets, the method can further include displaying an image of the scan indicating locations of detected checkerboard targets.

These and other advantages and features will become more apparent from the following description taken in conjunction with the drawings.

BRIEF DESCRIPTION OF THE DRAWINGS

The foregoing and other features, and advantages of the invention are apparent from the following detailed description taken in conjunction with the accompanying drawings in which.

The detailed description explains embodiments of the invention, together with advantages and features, by way of example with reference to the drawings.

DETAILED DESCRIPTION

The present invention relates to a 3D measuring device having a 3D scanner configured to detect or otherwise identify predefined target elements in a scanned volume. The elements can include, for example, target spheres (spheres) or target checkerboards (checkerboards). Such target elements can be used to register multiple scans together. That is, different scans of overlapping scan volumes can be synthesized together by aligning the target elements in each scan.

Currently, such synthesis is performed in a post processing step that is performed at a location remote from the laser scanner. In that processing, a user will identify the same target on different scans to provide reference points for scan registration. However, in some instances, one or more targets may be occluded in a particular scan or otherwise not detected. In such a case, registration between scan can be unstable and, in some cases, require that an additional scan be performed. This can lead to having to return the location where the scan was performed to perform one or more additional scans. This can delay the process of creating a complete scan for a certain scan volume. It shall be understood that the scan volume can include an object being scanned and that one or more of the targets can be located on the object.

In addition, there is not currently an indication that a desired number (or all) of known targets in a scanned volume have been captured in a particular scan. This is due to hardware constraints (e.g., memory) of the scanner. The devices disclosed herein include systems and methods that allow the scanner itself to identify the target elements from a few adjacent scan lines and, thus, processing need only be performed on a few individual scan lines (or portions thereof), not an entire scan. Once identified, target registration can be performed to register multiple scans or a particular scan against known external references.

Figure 1:
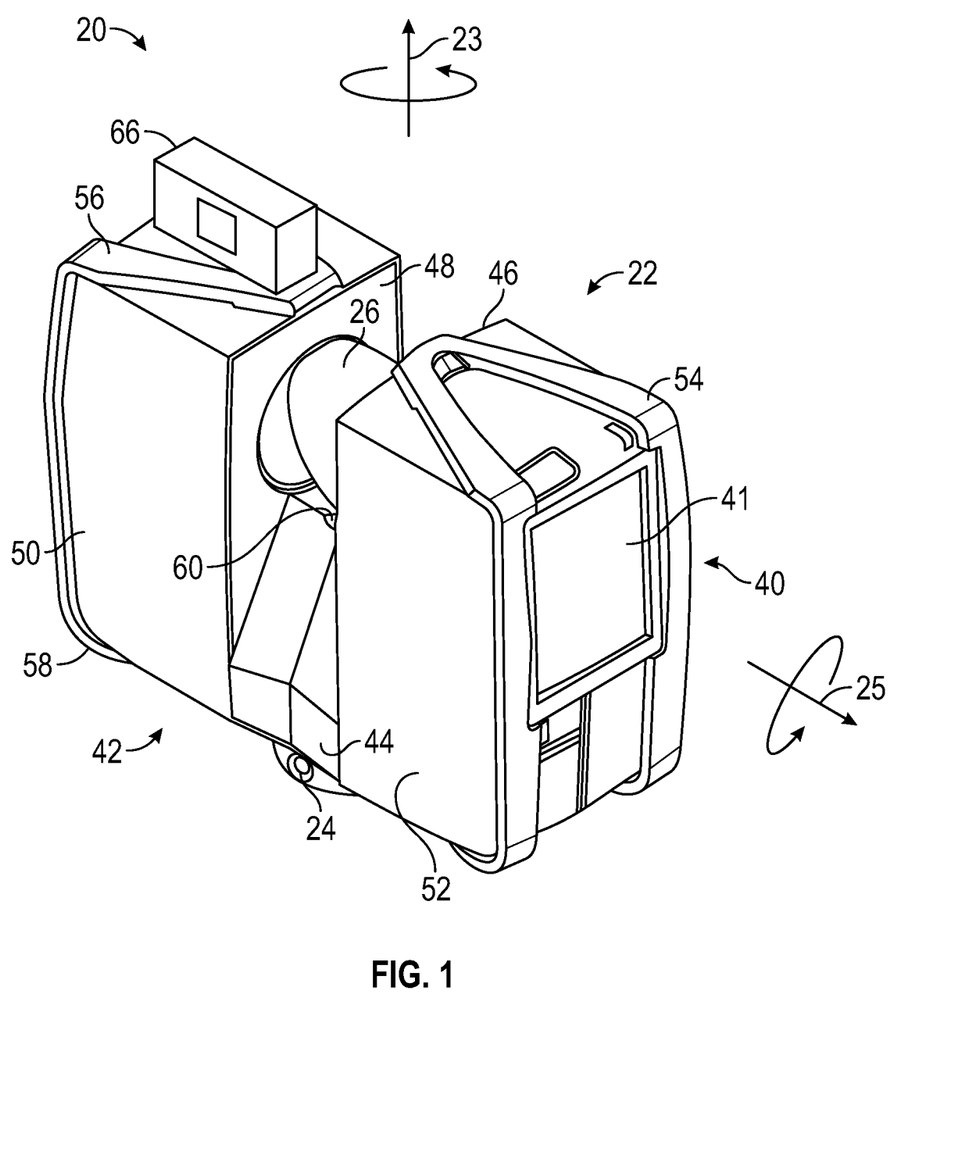
FIG. 1 is a perspective view of a laser scanner in accordance with an embodiment of the invention.
Figure 2:
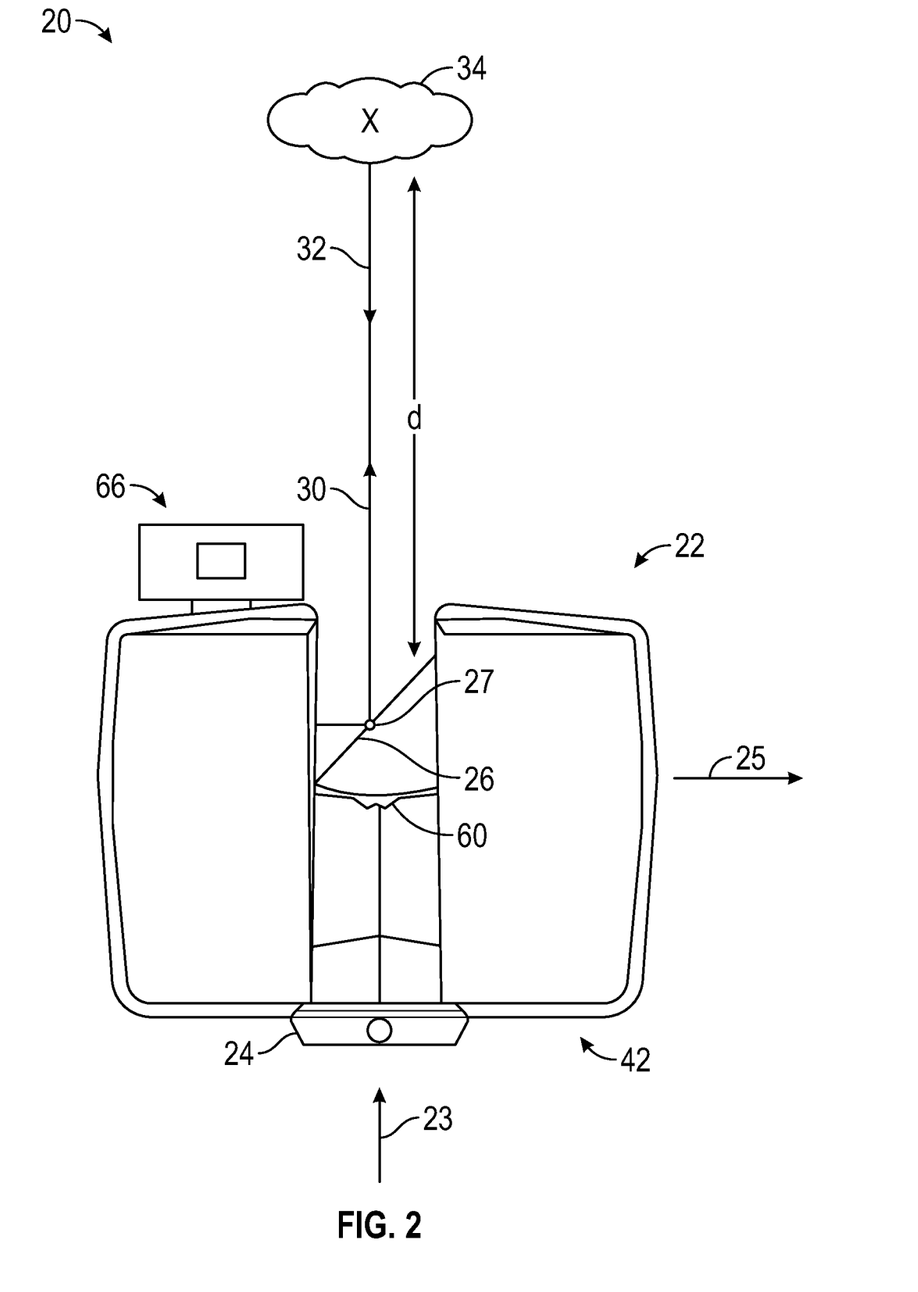
FIG. 2 is a side view of the laser scanner illustrating a method of measurement according to an embodiment.
Figure 3:
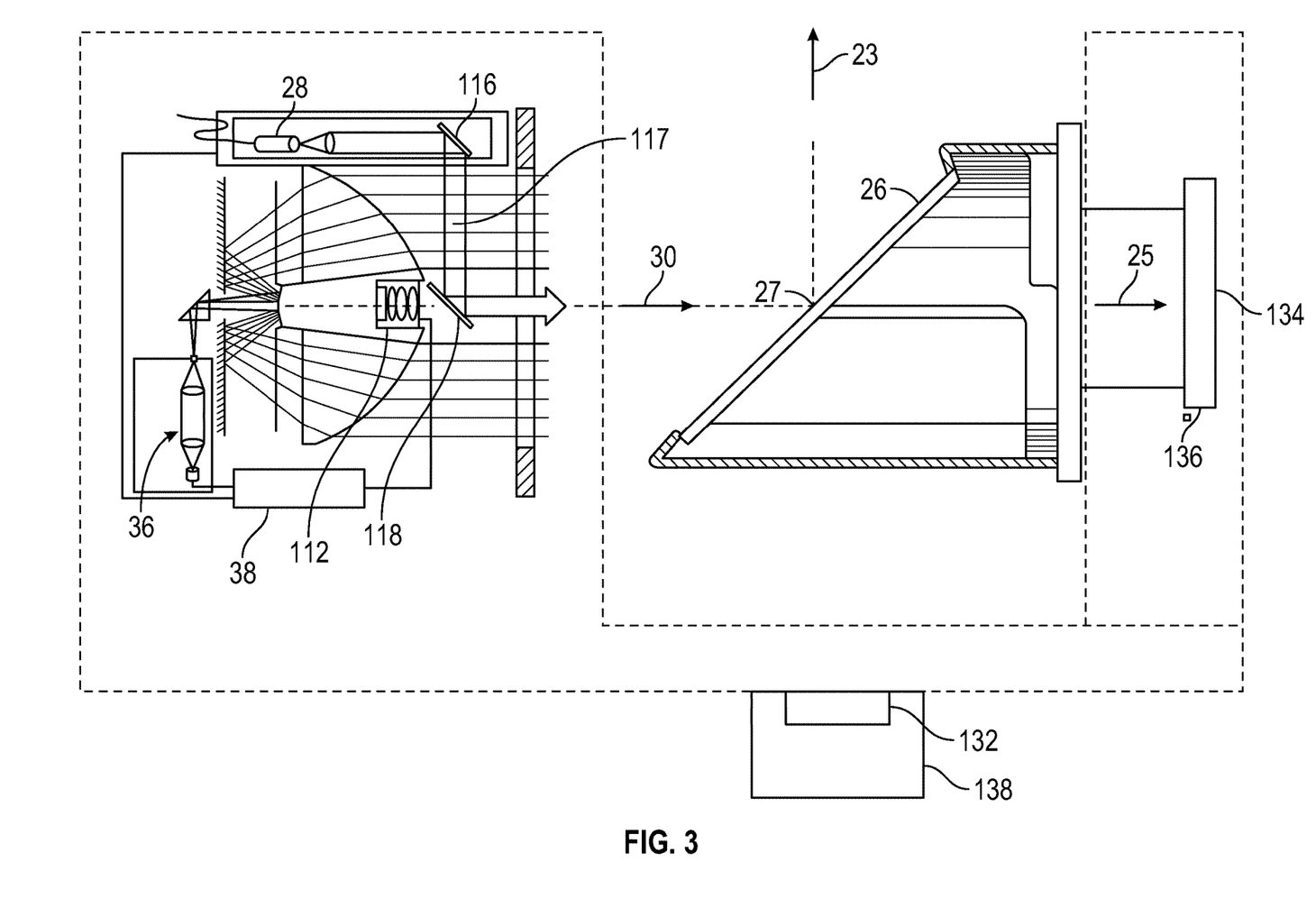
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis 23 may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers (nm), for example 790 nm, 905 nm, 1550 nm, or less than 400 nm. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner 20 of the type discussed herein is based on the time-of-flight (TOF) of the light in the air (the round-trip time for the light to travel from the device to the object 34 and back to the device). Examples of TOF scanners include scanners that measure round trip time using the time interval between emitted and returning pulses (pulsed TOF scanners). Of particular relevance are so-called phase shift laser scanners that modulate light sinusoidally and measure phase shift of the returning light (phase-based scanners). A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the scan volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror 26 rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an point X, the laser scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse member 44 adjacent the base 24. The first arm portion 58 for each yoke 54, 56 extends from the traverse member 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse member 44 or carrying structure 42, the walls 46, 48 and the shells 50, 52 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 52, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse member 44, a prism 60 is provided. The prism 60 extends parallel to the walls 46, 48. In the exemplary embodiment, the prism 60 is integrally formed as part of the carrying structure 42. In other embodiments, the prism 60 is a separate component that is coupled to the traverse member 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 (012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the rotary mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the dichroic beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the rotary mirror 26 about the axis 25.

Figure 4:
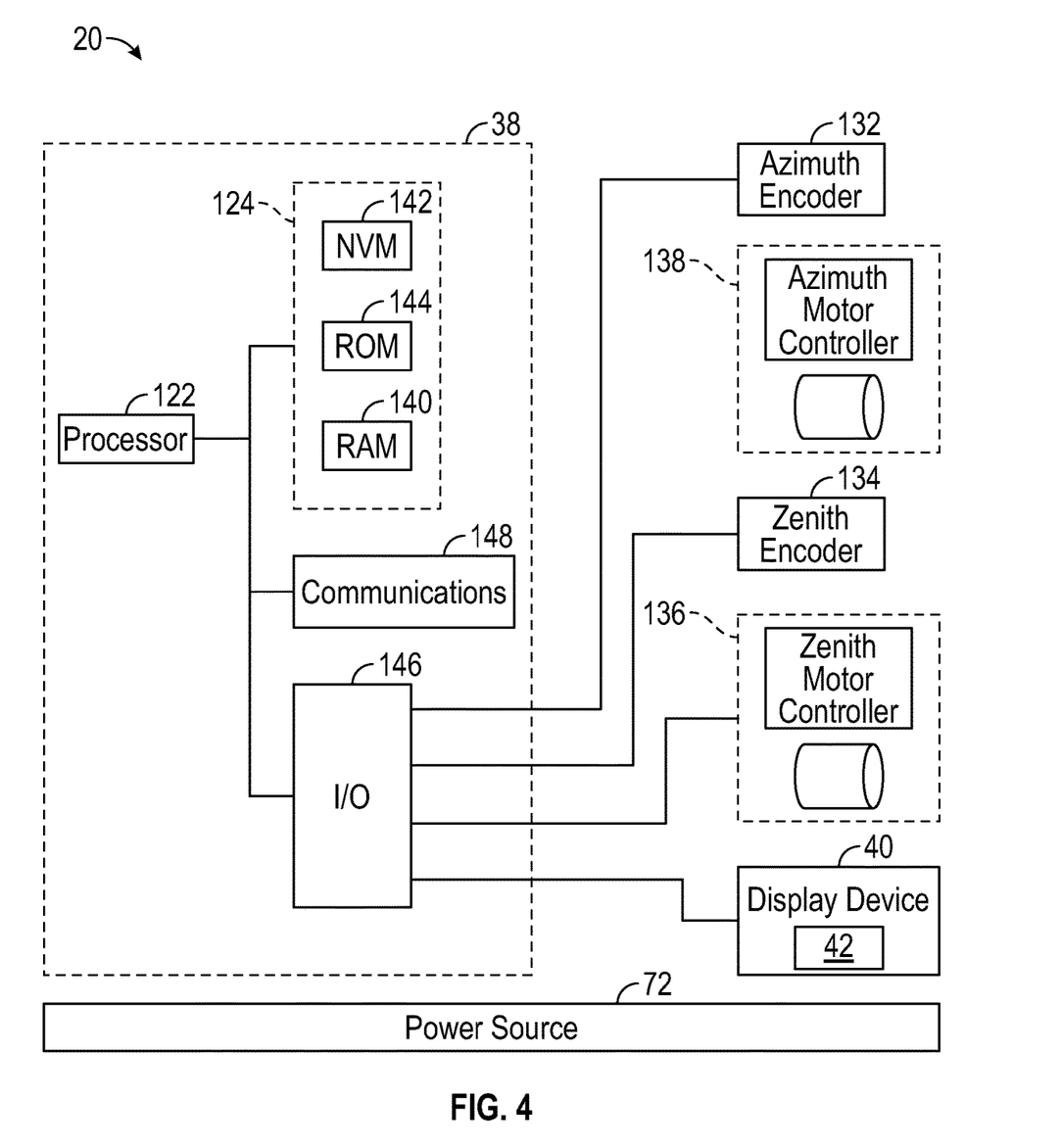
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processing elements or processor 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light emitter 28, and panoramic camera 126 and is given certain instructions for the purpose of generating a 3D point cloud of a scanned environment. Controller 38 provides operating signals to the light emitter 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(ˆ) Protocol), RS-232, ModBus, and the like. Additional scanners 20 may also be connected to the LAN with the controllers 38 in each of these scanner 20 being configured to send and receive data to and from remote computers and other scanners 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 148 provides an interface that allows wireless or wired communication with one or more external devices or networks, such as the LAN discussed above.

Controller 38 includes operation control methods embodied in application code that can be used to detect targets such a spheres and checkerboards. These methods are embodied in computer instructions written to be executed by processors 122, typically in the form of software. The software can be encoded in any language, including, but not limited to, assembly language, VHDL (Verilog Hardware Description Language), VHS IC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hyper- Text Markup Language), Python, Ruby and any combination or derivative of at least one of the foregoing.

Terms such as processor, controller, computer, DSP, FPGA are understood in this document to mean a computing device that may be located within an instrument, distributed in multiple elements throughout an instrument, or placed external to an instrument.

Herein, the identified targets may be displayed on a screen such as display device 40. A user can then verify that all or an acceptable number of targets have been captured in a particular scan. Of course, the display device 40 could also display an indication that all or an acceptable number of targets have been identified. The user can then indicate via the display device 40 (e.g., a touch screen 42 portion thereof) or another input if the scan is acceptable. If it is not, in one embodiment, the laser scanner 20 can be moved and a new scan run or left in the position and the scan run again. In this manner, the user can be provided with better certainty that multiple scans can be synthesized without error at a later time.

The laser scanner 20 can optionally include a power source 72 that provides power for operation of the laser scanner 20. The power source 72 can be a battery in one embodiment and may be rechargeable. Of course, the laser scanner 20 could alternatively or additionally be connected to an external power source.

As generally discussed above, and are shown in FIG. 5, when the laser scanner 20 operates from a fixed location (shown as (0, 0, 0) in FIG. 5) it generates a point cloud 150 that includes 3D points of a scene by rotating around its vertical axis 23 and horizontal axis 25. As used herein, the term "point cloud" refers to a collection of 3D coordinate data that are visually represented as points in space. The point cloud 150 is formed from points in a scan volume 160 of a particular scan. The scan volume 160 and the point cloud 150 can define a same volume in one embodiment.

Figure 5:
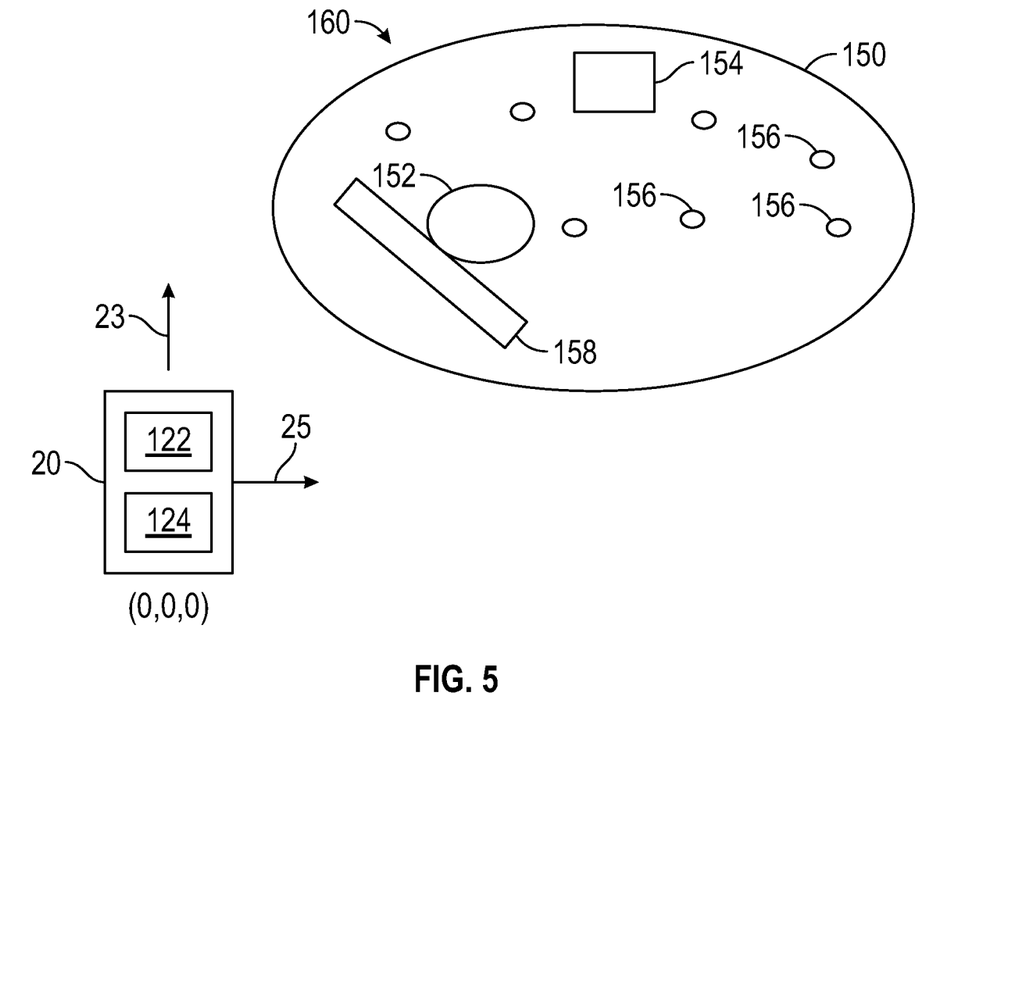
FIG. 5 shows a scan volume that includes targets to be detected or otherwise identified by a laser scanner according to one or more embodiments.

The illustrative point cloud 150 includes one or more targets that can be either a sphere target 152 or a checkerboard target 154. One or more of the targets 152, 154 can be located on an object 158 in the scan volume that defines bounds of the point cloud 150. As shown, only the sphere target 152 is on the object 158 for clarity but the skilled artisan that one or more checkerboard targets 154 could also be disposed thereon.

Other points in the point cloud 150 are generally indicated as points 156. It shall be understood that the targets 152, 154 can comprise several points and cross one or more scan lines. A "scan line" as the term is used herein includes all point 156 that are collected during a single rotation of the rotary mirror 26 about the horizontal axis 25, As discussed above, the scanner 20 can include one or more processors 122 are coupled to memory 124. The memory 124 can include a non-volatile memory (NVM) device for storing the coordinates of the locations in the point cloud 150. Such stored information can be referred to herein as a "scan" herein. A scan includes several scan lines to cover the scan volume 160. The scanner 20 in FIG. 5 can include any other elements of a scanner described herein as well.

To process information about the scan, some or all of the scan are brought into processor memory 124 such as RAM device 140. Currently, one or more of the size of the processors 122 and the memory 124 may be limited such that it cannot load an entire scan in order to determine where the targets are located in the scan volume 160/point cloud 150. As such, in the prior art identification of targets and registration between scans is done in a post-acquisition processing environment with software programs that are very processor and memory demanding.

Based on the teachings herein, targets 152, 154 can be identified in a scan 160 without needing additional hardware (e.g., processors or memory). Of course, such hardware could be added without departing from the scope of the embodiments disclosed herein.

By identifying the targets and ensuring all or a required portion of them have been identified in a particular scan volume 160 it can be assured that the required information for registering multiple scans together is present while the scanner 20 is still located at or near the scan volume 160 (i.e., the scanner 20 has been removed or put away)

Figure 6:
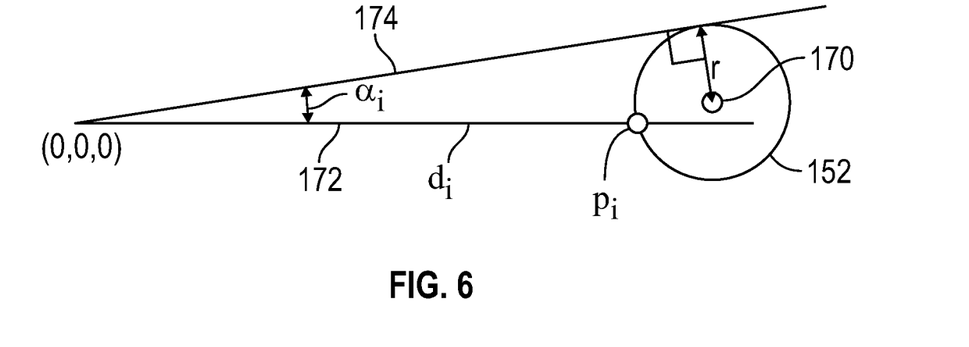
FIG. 6 is a simplified illustration of a sphere target that includes certain distances and angles from an origin that represents a location of a laser scanner during a scan.
Figure 7A:
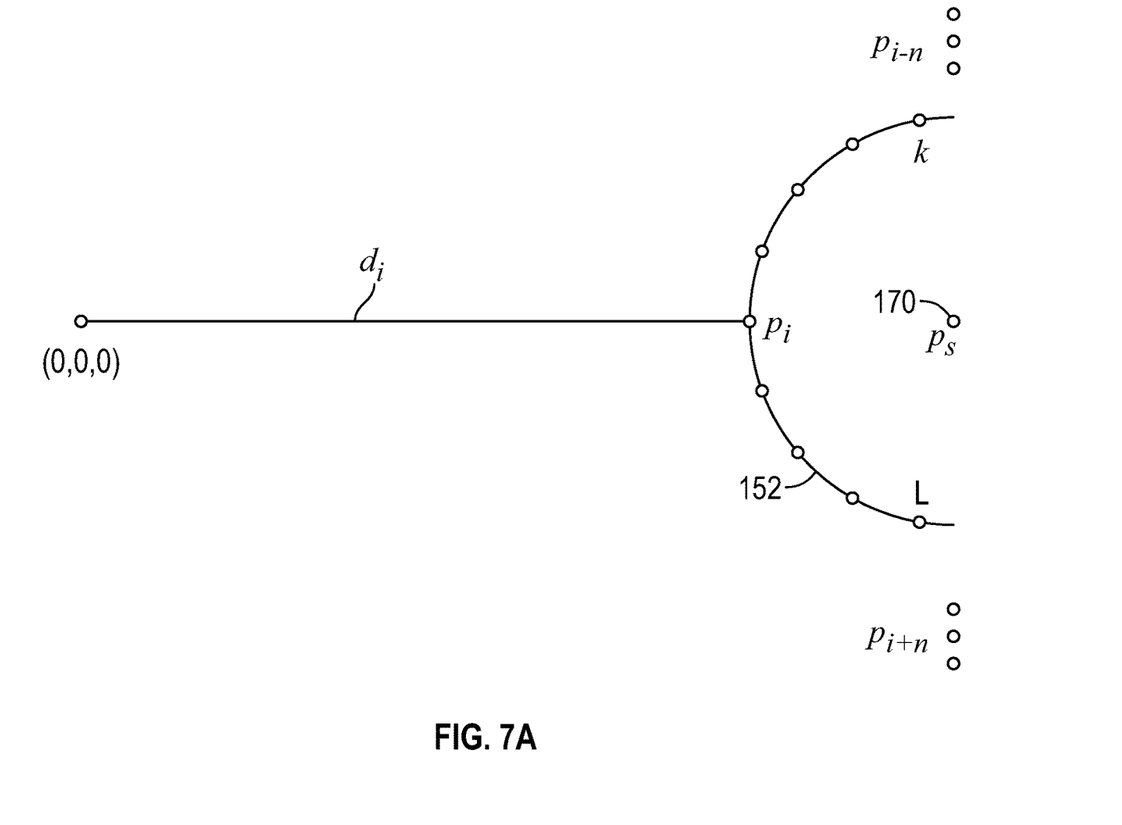
FIG. 7a shows points that can occur on a sphere in a single line of a scan performed by a laser scanner.
Figure 7B:
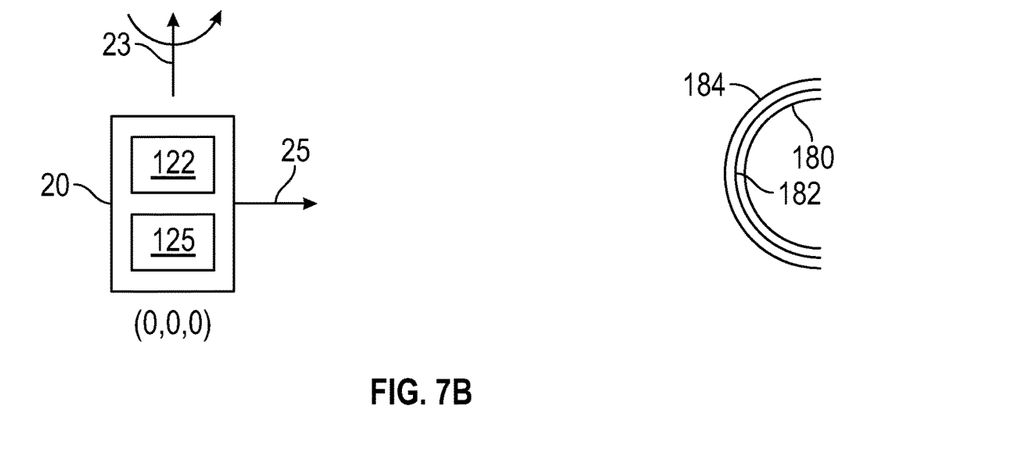
FIG. 7b shows successive scan lines that are contacting the possible sphere target being relative to the laser scanner.

With reference now to FIGS. 5-7, a process by which spherical targets (e.g., sphere target 152) can be detected is described. The process can be performed on a single scan line meaning that the processor 122 or memory 124 does not need to load the entire scan in order to identify the sphere target 152. As discussed further below, single scan line processing can identify potential sphere target 152 locations (and in particular, potential center points of the sphere targets) and the actual location can be selected from the possible locations by a process that has limited processor and/or memory requirements.

As shown in FIG. 6, a sphere target 152 includes a radius r. The size and thus the radius r is known for each sphere target 152 in one embodiment.

Each point (p) on the sphere target 152 will include a 3D coordinate $p_i = (\phi_i, \theta_i, d_i) = (x_i, y_i, z_i)$. $\phi_i$ is the rotation about angle about vertical axis 23. This angle changes very little over a scan line. $\theta_i$ is the rotation about the horizontal axis 25 and is limited from 0 to $2\pi$ and $d_i$ is the distance from the origin (0,0,0) to particular point $p_i$ on a outer surface of the sphere target 152.

In the identification of possible locations of sphere targets 152 as described herein, a sliding window of size 2n+1 is moved along the points in a single scan line to determine if a particular point in the middle of this range ($p_i$) is between the origin and the center 170 of the sphere target 152. This assumes that 2n+1 points can be held in memory at once for a particular calculation.

Examples of such a window can be expressed as $[p_{i-n}, p_{i-n+1}, \ldots, p_{i-1}, p_i, p_{i+1}, \ldots p_{i+n-1}, p_{i+n}]$. The size of n can be selected based on available memory and processor size. In this regard, n is the number points that can be detected on a scan line within a distance defined by a radius (r) of a sphere to be detected.

As will be understood, if a point $p_i$ satisfies the requirements of being between the origin and a center a sphere target 170, point $p_i$ can indicate that a possible sphere location has been detected.

In more detail, if line 172 from the origin (0,0,0) passes through $p_i$ and hits the center 170 of the sphere target 152, then:

$$\alpha_i = \arcsin(r/d_i + r).$$

wherein $\alpha_i$ is angle between the line 172 and a line 174 passing through the origin (0,0,0) that is tangent to the sphere.

Given that relationship then, and with reference now to FIGS. 7A, exactly all points $p_j$ with j in the range from i−n to i+1 and $$|\theta_i - \theta_j| < \alpha_i$$

are potentially on a sphere target 152. This is graphically shown where points on the sphere target 152 are between k and l with k and l defined by lines at $+\alpha$ and $-\alpha$ from the origin (0,0,0) Accordingly, the points on the possible sphere target 152 are defined from k to l where i−n<=k<i<l<=i+n.

In FIG. 7a, each point illustrated of a possible sphere target 152, is contained on a single scan line. The scan line, while not illustrated, is generally vertical but due to rotation about the vertical axis of the scanner during a scan can be slightly offset from vertical. The amount of deviation from vertical may vary depending on the resolution of a particular scan. Herein, scan lines will generally be considered vertical but the skilled artisan will realize that slight deviation is possible.

With reference now to FIG. 7b, for each successive scan line that is contacting the possible sphere target 152 multiple version of the points defining a possible center point (ps) will be created. For example, as the scanner 20 rotates about the vertical axis 23, it will create determine locations of points on successive curves 180-184 that are slices of the sphere target 152 taken on successive lines. In particular, the curve 180 defined by points in window as defined above created when the scanner 20 has measured points on a scan line that touches an outer edge (from the perspective of the scanner 20) of the target 152. A next curve 182 can be created from points detected in a next scan line and so on. While a curve a shown, that is for ease of understanding and such a curve need not actually be rendered or otherwise formed to implement the teaching herein.

To find the scan line 180-184 that includes the optimal sphere center position (ps), an error function can be minimized. That function can take the form:

$$f(ps) = \sum_{i=k}^{l} \left(r - \sqrt{(x_i - x_s)^2 + (y_i - y_s)^2 + (z_i - z_s)^2}\right)^2$$

One initial starting point for the center is ($\phi_i$, $\theta_i$, $d_i$+r). If the error value is less than a threshold value (t), the computed position ps and the error are saved as a potential solution (e.g., a potential target location). The above function can be applied during a scan on each middle point (pi) in the moving scan window.

In a post processing step, potential target locations that are close to each other (e.g., less than 2r apart), the ones with the higher error values are eliminated. Thus, the one with the small error can be determined to be the actual location. This post processing can compare successive potential locations to one another and keep updating the current "best" location until the error begins to increase. Of course, other methods could be employed for each potential but stopping after the error begins to increase may save computation and is based on the assumption that the first identified location will be at or near an edge of a sphere.

Also, in one embodiment, in the case where a horizontal pipe with a radius that is the same the sphere target, each scan line will create horizontal detected spheres which can be eliminated.

Figure 8:
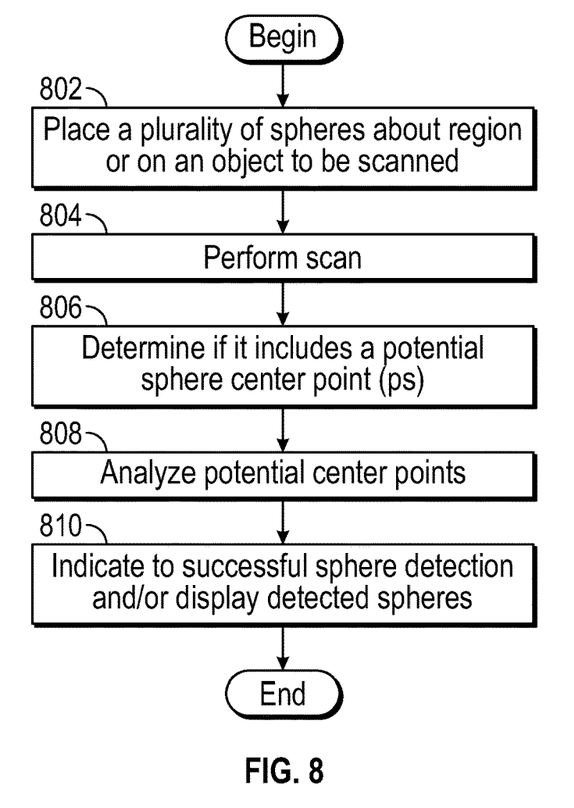
FIG. 8 is a block diagram depicting a method of identifying a sphere target in a scan volume according to one embodiment.

FIG. 8 is flow chart of operation according to one embodiment. The following description will reference at least FIG. 5 and possibly others. The process begins at block 802 where a plurality of spheres are distributed about a region (scan area) or on an object to be scanned. Such a scan area will define, for example, the bounds of the point cloud 150. The number of spheres can be varied from any number one or greater. In one embodiment, the number of spheres so distributed about the scan area can be recorded, for example, in memory of the laser scanner 20.

At block 804 a scan is performed. The scan can be a full scan with 360° rotation about the vertical axis 23 or can be a limited scan.

During the scan or at a later time, the points on each scan line are analyzed to determine if it includes a potential sphere center point (ps) as indicated at block 806. This analysis can include solving the error function described above where all points that are within the threshold t are stored by position and error and are considered potential sphere center point.

At block 808, all potential center points are analyzed. This analysis can be performed after the scan is completed in one embodiment. The analysis can include comparing some or all potential center points that are within 2r of each other and selecting the one with the lowest error. The one with the lowest error is the center point that aligns with the actual center point of a sphere target. This can be done in real time or after the scan is completed. Further, in some cases, not all center points need to be compared to each other. For example, if a local error minimum is found during and one or more subsequent center points have a higher error minimum, process can stop.

At block 810 the user can be notified if the sphere detection in the scan area was successful. This can include, if the number of center points found at block 808 is the same as the expected number of spheres, notifying the user at block 810. Alternatively, if the number is different the indication in block 810 can be that the number is different (e.g., lower) than expected and that a new scan needs to be performed. In this manner, all expected spheres will be contained in the scan when, at a later time, different scans need to be synthesized. In one embodiment, the notification can be implanted by provide the user an image of the scan area including marking locations of detected spheres. That is, to the extent the scanner can render an image from a scan, the image could be displayed with the locations of the sphere (or any other target) indicated thereon.

In the above discussion it has been assumed that full scan has been performed. It shall be understood that a "quick" scan could be performed with lower resolution to find the spheres as discussed above and then a full scan with higher resolution performed with or without sphere detection being performed. Further to the extent that it desired, in one embodiment, the detection process can be stopped after the known number of spheres has been found.

Figure 9:
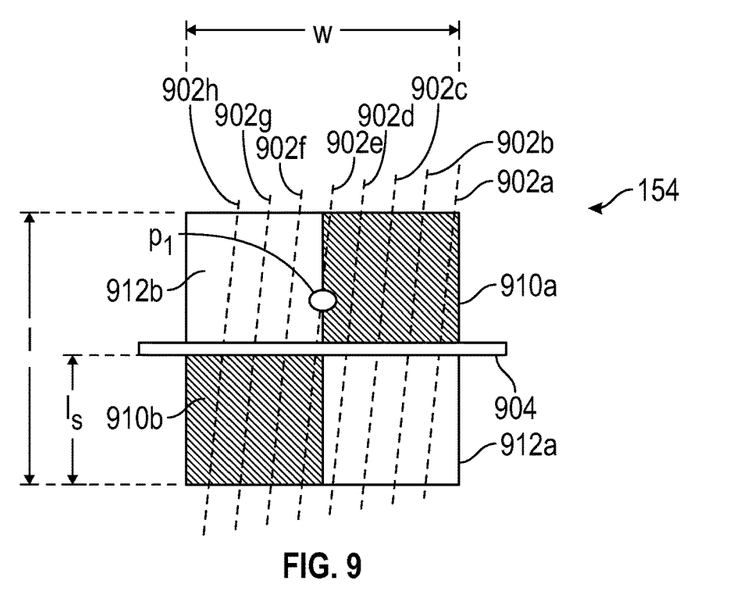
FIG. 9 shows an example of a checkboard target overlaid of scan lines to define transition locations and a transition line.

As discussed above, other types of targets can also be implemented utilizing other types of targets. One such target is a so-called checkerboard target. As example of a checkerboard target 154 is shown in FIG. 9. As illustrated the checkerboard target 154 includes a width w and a length 1 that can be equal in one embodiment. With further reference to FIG. 5, one or more checkboards 154 can be located in the scan volume 160. It should be understood both sphere targets 152 and checkerboard targets can be placed in the scan volume 160 or only one type can be included.

As generally discussed above, and a shown in FIG. 5, when the laser scanner 20 operates from a fixed location (0, 0, 0) and generates a point cloud 150 that includes 3D points of a scene by rotating around its vertical axis 23 and horizontal axis 25. The point cloud 150 is formed from points the scan volume 160 of a particular scan.

One or more of the checkboard targets 154 can be located on an object 158 in the scan volume 160. Other points in the point cloud 150 are generally indicated as points 156. It shall be understood that the checkerboard target 154 can comprise several points in a point cloud and cross one or more scan lines.

Based on the teachings herein, checkboard target 154 can be identified in a scan volume 160 without needing additional hardware (e.g., processors or memory). Of course, such hardware could be added without departing from the scope of the embodiments disclosed herein.

By identifying the targets and ensuring all or a required portion of them have been identified in a particular scan it can be assured that the required information for registering multiple scans together is present while the scanner is still in area of the scan volume 160.

With reference now to FIG. 9, an explanation of one manner of identifying a checkboard target 154 in a scan is described. Portions of the method can be performed on points of a single scan line as the line is being scanned by any scanner disclosed herein. Thus, an entire scan does not be loaded to determine if the targets have been acquired.

In one embodiment, the processing can happen in real time as each scan line is acquired. As discussed above, due to the unique and efficient method of identifying checkboard targets 154 as discussed herein, the identification of them can be done using limited hardware and, in one embodiment, on a field programmable gate array (FPGA). It will be understood that the above described sphere detection method could also be performed using an FPGA.

During a scan, one or more scan lines 902 will cross or otherwise be formed over the checkboard target 154. In FIG. 9 the collection of points acquired during as the scanner moves along each scan line 902 is represented by the dotted nature of the scan line. The number of points in a line or spacing between is not limited by this representation and will depend on the resolution of a particular scan as will be understood by the skilled artisan based on the teachings above.

Each point in a particular scan line along a line that is generally vertical but due to rotation about the vertical axis 23 of the scanner during a scan can be slightly offset from vertical as illustrated in FIG. 9. As above, the amount of deviation from vertical may vary depending on the resolution of a particular scan. Herein, scan lines will generally be considered vertical but the skilled artisan will realize that slight deviation is possible.

The method is continually performed on each scan line to identify transitions from a dark or black section 910 to a light or white section 912 of a checkboard target 154 or vice versa along a scan line 902. Herein, a transition from a black section 910 to a white section 912 can be referred to as a black to white transition. Such a transition can also be referred as a transition from a first color to a second color. The reverse is also true. For example, a transition from a white section 912 to a black section 910 can be referred to as a white to black transition. Such a transition can also be referred as a transition from a second color to a first color. As discussed in more detail below, a transition will occur when adjacent segments change color in one embodiment. Such segments can be included in a single scan line.

Each of the black and white sections 910, 912 are shown as squares but other shapes are contemplated. An example of where such transitions occur are illustrated by transition line 904 in FIG. 9. The transition line 904 is generally horizontal but that could be slightly varied in certain instances without causing a degradation in identification accuracy.

Each scan line 902 can be analyzed to determine the location of such transitions. In one embodiment, all of the points where transitions occur are stored for further processing. One way to determine a transition is to group "white" points together into a segment believed to be on a white section 912 of a target as they are detected and "black" points together into a segment believed to be on a white section 910 of a target as they are detected. Eventually, a point will be encounter that is not be grouped into a segment. If that point becomes a part of segment of the opposite color, it is a transition point and can be stored. Whether a point is black or white can be determined, for example, by its reflectance value. An adjacent point on a scan line can be included in a segment if it is at a same or about the same distance from the 3D scanner. The points need not be at exactly the same distance and a distance is "about" the same distance from the scanner if it within + or −1% of the distance of the last point in the segment from the 3D scanner.

A line such as transition line 904 can then be fit to the transition points of adjacent scan lines. The length of the transition line 904 is preferably the same as the width w of the checkboard target 154. This length can limit how much memory is required to perform the method as only transitions over a limited length need to be considered. I most instances, the checkboard target 154 will be are planar. Therefore, a single scan line hitting a checkboard has to be a straight line in 3D (equivalent to the circle on a sphere). Assuming that all points of one scan line that hit a checkerboard could be kept in memory (similar to the sliding window for spheres discussed above), a straight line fit can be formed for those points (e.g., similar to the scan lines 902 illustrated in FIG. 9. If the error values are above a threshold one can drop possible black/white transitions. The same holds for the of transition line 904. Again, a straight line could be fitted into all black/white and white/black transitions.

In FIG. 9, the transition line 904 is shown as extending beyond the edges of the checkboard target 154 for ease of viewing and not by way of limitation. The transition line 904 will, of course, join adjacent transitions from black to white (e.g., at the transitions along scan lines 902a-902d) but also continue the line through adjacent transitions from white to black (e.g., at the transitions along scan lines 902f-902h). In some cases, there may be lines that exhibit more than one transition such a line 902e that transitions from black to white (point p1) and then back to black at the transition line 904. Based on the segment length (discussed below) the process may interpret only the second transitions just described or this point can be omitted. In the case where it is omitted, it will be understood that adjacent transitions points skip a scan line and will be contained, for example, on lines 902d and 902f. Thus, as used herein, "adjacent scan lines" can refer to adjacent lines that include a transition when discussing the process of identifying checkerboard targets.

During the process of identifying segments, a segment may not be considered unless it is longer than a threshold. In one embodiment, the threshold can be a percentage of a segment length $l_s$. Of course, the threshold could be based on the length l or width w of the checkboard target 154 or some other length. Examples thresholds include 10, 20, 30, or 40% of the segment length. In another embodiment, rather than length, a number or threshold of adjacent points that are the same color could be used. In either case, in one embodiment, if the segment is longer than a segment length (or contains more points than could be in a segment length) the "segment" is excluded from being includes as a part of a checkboard target 154.

Consider for example a scan with scan lines that successively cross the checkboard target 154 moving from right to left and from top to bottom across the of FIG. 9. In such a scan, a first scan line 902a will first encounter a first dark section 910a. In general, the reflectance values of points along the first scan line 902a and on the first dark section 902a will be generally the same and below a threshold value. Determination that a black section has been detected can be made after a lower threshold of adjacent points all satisfy the above conditions. If, either during or scan or after, a "black square" is detected, then the process will begin looking for an adjacent "white square" such as a first white section 912a. With reference to FIG. 9, the location of a transition between the first black section 910a and a first white section 912a along the first scan line 902a can be recorded. The same process can be performed for each successive scan line 902b-902h.

Continuing with the scan illustrated in FIG. 9, eventually rather than encountering a "black square," a next scan line (e.g., 9020 will first encounter a white section 912b. The same process as described above can be applied in the reverse order to find a transition to the second black section 910b.

Further, the skilled artisan will realize that because the size of the checkboard target 154 may be known a priori, regions that exhibit a transition that are not targets if they are too large.

Figure 10:
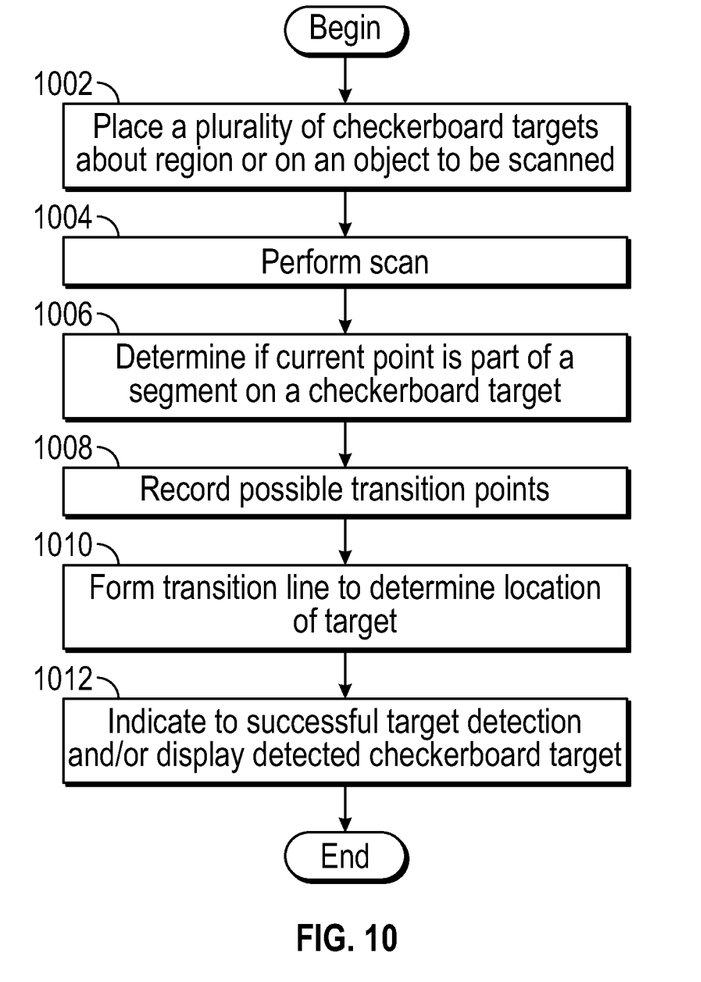
FIG. 10 is block diagram depicting a method of identifying a checkboard target in a scan volume according to one embodiment.

FIG. 10 is flow chart of operation according to one embodiment. The following description will reference at least FIG. 9 and possibly others. The process begins at block 1002 where a plurality of checkboard targets 154 are distributed about a region (scan area) or on an object to be scanned. Such a scan area will define, for example, the bounds of the point cloud 150. The number of checkboard targets can be varied from any number one or greater. In one embodiment, the number of checkboard targets so distributed about the scan area can be recorded, for example, in memory of the laser scanner 20.

At block 1004 a scan is performed. The scan can be a full scan with 360° rotation about the vertical axis 23 or can be a limited scan.

During the scan or at a later time, the points on each scan line are analyzed to determine if a point is part of a segment on a checkerboard target. indicated at block 1006. This analysis can include grouping adjacent similar or same points (e.g., points scanned from a region of a target together) into a segment until a "next point" is of the opposite color. If the next point can then be grouped into segment of the color or a known next target region), it can be recorded as a possible transition point at block 1008.

The possible transition points can then be fit to a transition line that will define the location of the target at block 1010. Similar to the above, at block 1012 the user can be notified if the target detection in the scan area was successful. This can include notifying the user at block 1012 that all expected targets were detected. Alternatively, if the number is different the indication in block 1012 can be that the number is different (e.g., lower) than expected and that a new scan needs to be performed. In this manner, all expected will be contained in the scan when, at a later time, different scans need to be synthesized. In one embodiment, the notification can be implanted by provide the user an image of the scan area including marking locations of detected spheres. That is, to the extent the scanner can render an image from a scan, the image could be displayed with the locations of the sphere (or any other target) indicated thereon.

With reference again to FIG. 5, it shall be understood that both types of targets can be included in a scan area and both methods can be employed at the same time, sequentially or at different times.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A three-dimensional (3D) measuring device comprising:
    a processor system including a processor;
    a housing;
    a 3D scanner disposed within the housing and operably coupled to the processor system, the 3D scanner having a light source, a beam steering unit, a first angle measuring device, a second angle measuring device, and a light receiver, the beam steering unit cooperating with the light source and light receiver to define a scan area, the light source and the light receiver configured to cooperate with the processor system to determine locations a plurality of points in the scan area;
    wherein the processor is configured to identify locations of one more checkerboard targets disposed in the scan area by:
    identifying transition locations where adjacent segments on a single scan line transition from a first color to a second color;
    recording locations of the transition locations as first to second color transition locations;
    identifying and recording transition locations where adjacent segments on a single scan line transition from the second color to the first color as second to first color transition locations;
    forming a transition line through adjacent first to second color transition locations and adjacent second to first color transition locations; and
    identifying a location of a checkerboard target based on the transition line.

2. The device of claim 1, wherein the processor is configured to form segments by determining that adjacent points on a scan line have a same color and are at about a same distance from the 3D scanner.

3. The device of claim 2, wherein the processor is configured to determine that a particular point is a transition location by determining if the particular point is at or near an end of segments on a single scan line.

4. The device of claim 2, wherein the checkerboard target includes a plurality of white and black sections, each having a section length $l_s$, and each segment has a segment length that is at least 10% of the section length $l_s$.

5. The device of claim 2, wherein the checkerboard target includes a plurality of white and black sections, each having a section length $l_s$, and each segment has a segment length that is less than the section length $l_s$.

6. The device of claim 2, wherein the transition line has a length that is the same or shorter than a length of the checkboard target.

7. The device of claim 1, further comprising:
    a display device.

8. The device of claim 7, wherein the processor is configured to indicate if some or all of a detected number checkerboard targets matches a number of checkerboard targets in the scan area.

9. The device of claim 7, wherein the processor is configured to display an image of the scan indicating locations of detected checkerboard targets.

10. A method of scanning a scan area with a three-dimensional (3D) measuring device comprising:
- rotating the 3D scanner about a first axis, the 3D scanner having a light source, a light receiver and a photogrammetry camera;
- emitting a plurality of light beams from the light source and receiving with the light receiver a plurality of reflected light beams from an object surface within the scan area;
- determining, with a processor system, 3D coordinates of a first collection of points on the object surface within a scan area based at least in part on the plurality of light beams and the plurality of reflected light beams;
- identifying transition locations where adjacent segments on a single scan line transition from a first color to a second color;
- recording locations of the transition locations as first to second color transition locations;
- identifying and recording transition locations where adjacent segments on a single scan line transition from the second color to the first color as second to first color transition locations;
- forming a transition line through adjacent first to second color transition locations and adjacent second to first color transition locations; and
- identifying a location of a checkerboard target based on the transition line.

11. The method of claim 10, further comprising forming segments by determining that adjacent points on a scan line have a same color and are at about a same distance from the 3D scanner.

12. The method of claim 11, wherein a particular point is a transition location if the particular point is at or near an end of a segment on a single scan line.

13. The method of claim 11, wherein the checkerboard target includes a plurality of white and black sections, each having a section length $l_s$, and each segment has a segment length that is at least 10% of the section length $l_s$.

14. The method of claim 11, wherein the checkerboard target includes a plurality of white and black sections, each having a section length $l_s$, and each segment has a segment length that is less than the section length $L_s$.

15. The method of claim 11, wherein the transition line has a length that is the same or shorter than a length of the checkboard target.

16. The method of claim 11, further comprising:
- indicating if some or all of a detected number checkerboard targets matches a number of checkerboard targets in the scan area.

17. The method of claim 11, wherein further comprising displaying an image of the scan indicating locations of detected checkerboard targets.

* * * * *